3,302,301
APPARATUS FOR DRYING AND TREATING OF
HAIR VIA ULTRASONICS
Ralph W. Goble, Boulder, Colo., assignor to The Engineering & Development Company of Colorado, Boulder, Colo., a corporation of Colorado
Filed June 6, 1966, Ser. No. 555,629
13 Claims. (Cl. 34—99)

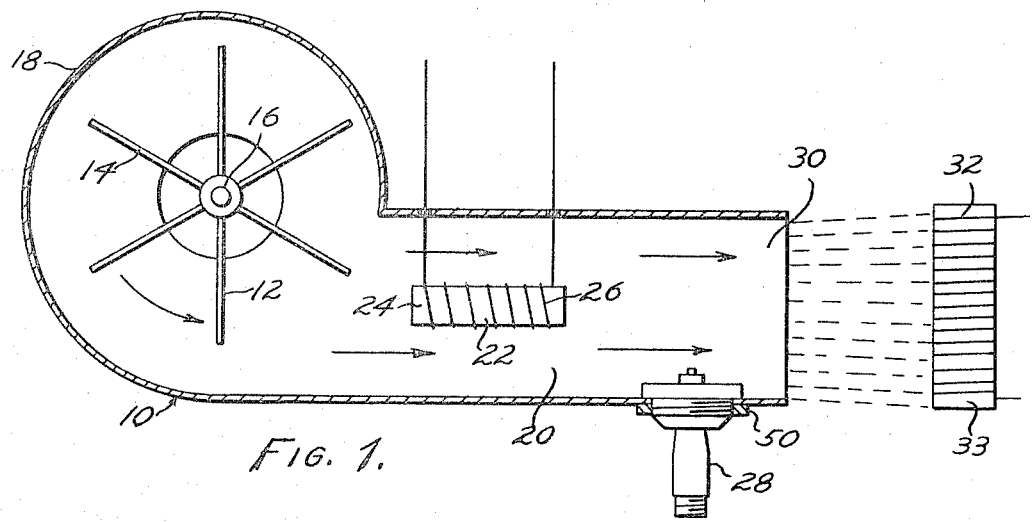
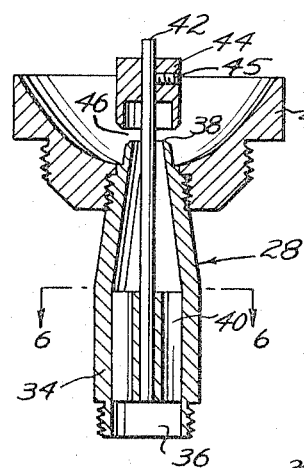
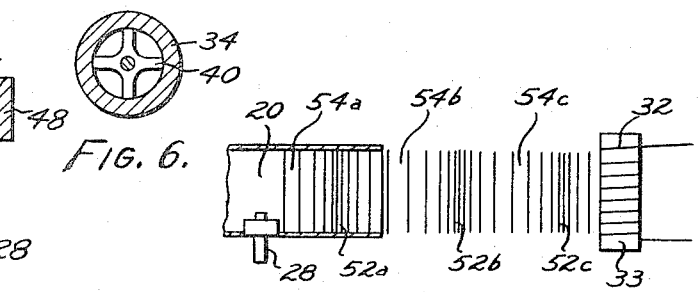
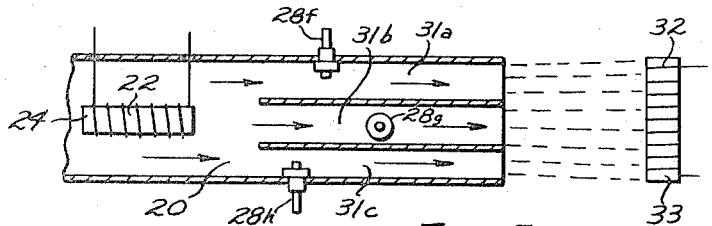
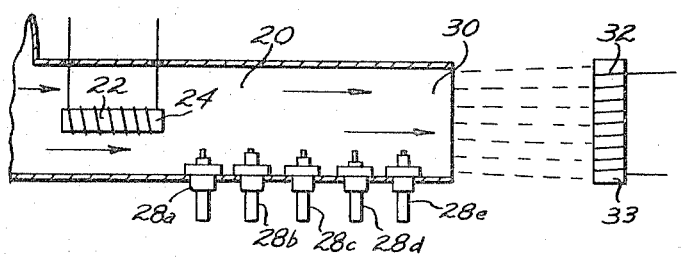
INVENTOR.
RALPH W. GOBLE
ATTORNEYS INVENTOR.
RALPH W. GOBLE
BY
Anderson, Spangler & Wymore
ATTORNEYS INVENTOR.
RALPH W. GOBLE
BY
Anderson, Spangler & Wymore
ATTORNEYS United States Patent Office 3,302,301
Patented Feb. 7, 1967

This is a continuation-in-part of application Serial No. 297,162, filed July 23, 1963, now Patent No. 3,254,424.

The present invention relates to an improved apparatus for drying and treating hair or other fibers. More specifically, this invention involves novel apparatus for using ultrasonic energy in the drying and treating of hair and other fibers so as to produce a predetermined set therein.

Ultrasonics is defined as a general term referring to the generation, detection and/or utilization of vibratory mechanical energy, usually but not necessarily beyond the audible range.

Ultrasonic vibration can be obtained from suitably activated piezoelectric or magnetostrictive transducers, airjet monowhistles, or from any other source capable of providing the necessary high frequencies. Other sources such as sirens, electromagnetic and ionized air loud speakers or tweeters and a wide variety of whistles may be used successfully in the instant invention. While frequencies above about 3 kilocycles are satisfactory, it is usually found that frequencies above the audible range are to be desired for personal comfort.

Piezoelectric transducers are natural or synthetic crystals which have the inherent ability to undergo mechanical deformation, or changes in dimensions, when an electrical potential is placed across the crystal. Materials such as lithium sulfate, barium titanate, ammonium dihydrogen phosphate, lead zirconate titanate, and the like possess piezoelectric characteristics and have been used successfully. In one embodiment of the present invention, piezoelectric transducers are utilized.

A magnetostrictive transducer is a similar device which makes use of the ability of certain metals to undergo minute expansions and contractions when subjected to an oscillating magnetic field. These effects are of the greatest magnitude in such metals as iron, nickel, cobalt and their alloys.

An air-jet monowhistle can also be used as a source of ultrasonic energy. The monowhistle is comprised of a resonant chamber and may include a horn to focus the ultrasonic vibration.

A principal object of the present invention is the provision of a hood arrangement to facilitate the treatment of hair on the human head and the arrangement and positioning thereon of various generators of ultrasonic energy.

Using the apparatus of the present invention, a method of treating hair or other fibers with ultrasonic energy comprises wetting the hair with an aqueous media, such as water, and arranging the hair or other fibers and forcibly restraining same in a predetermined configuration. The fibers are then contacted with a fluid stream which is modulated at an ultrasonic frequency by the application of ultrasonic energy thereto, in a manner to be later explained, whereby the fibers so treated will selectively remain indefinitely in the predetermined configuration on removal of the restraining force. The apparatus of the invention has been found to have particular utility and efficiency in the curling and decurling of human hair. It has additionally been found that modulating an air stream in the ultrasonic range in connection with hair drying produces a much more rapid and efficient drying of the hair.

Other objects and advantages of the invention will become apparent from the description hereinafter following and the drawings forming a part hereof, in which:

FIGURE 1 is a partly schematic and partly a plan view of one embodiment of the apparatus in accordance with this invention;

FIGURE 2 is a view in section of one form of a whistle which may be used in this invention for ultrasonically modulating the heated air;

FIGURE 3 is a diagrammatic view of the modulated air stream as it is believed it would appear on impinging the hair;

FIGURE 4 is a schematic view, with parts broken away to conserve space, of the apparatus shown in FIGURE 1 wherein the outlet end of the conduit is provided with a plurality of whistles mounted in the conduit.

FIGURE 5 is a schematic view, with parts broken away to conserve space, of the apparatus shown in FIGURE 1, wherein the conduit is divided into several channels each provided with a whistle;

FIGURE 6 is a view in cross section along line 6—6 of FIGURE 2;

Figure 7:
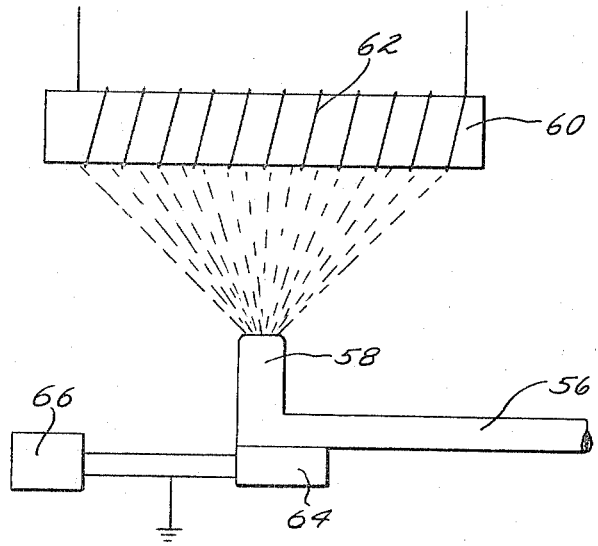
FIGURE 7 is a view in elevation of an arrangement according to the invention embodying an ultrasonic modulated fluid jet stream.

Referring now to FIGURE 1, the apparatus includes an air blower and heating device indicated as 10. This may be merely a portable hair drying apparatus or it may be any of the large air heating devices used commercially, adapted to produce a heated or non-heated fluid stream. The fan 12 with its blades 14 are rotatably mounted within the housing 18 on the hub 16 and are rotated thereon by a suitable electric motor and the like, not shown. The housing 18 opens into an elongated conduit 20 and within the conduit is mounted a heating element 22 that heats the air which is forced past the heater 22 by the aforesaid fan 12. The type of heating element is not critical; however, it may be an asbestos board 24 around which are wound high resistance heating wires 26 through which an electric current is passed from a suitable current source. A suitable ultrasonic generator means such as a whistle 28, to be described in detail hereinafter, is mounted in the conduit 20 downstream of the heating element and is preferably actuated by a relatively high pressure external source of air. The purpose of the generator means 28 is to produce ultrasonic modulation in the heated air stream passing through the conduit 20 prior to its leaving the air heating device 10 at the exit 30. It will be noted that the whistle, which may also be one of a series of whistles, is mounted downstream of the heating element in order to provide the proper efficiency in the ultrasonic modulation of the heated air stream which ultimately will contact the hair fibers. If the generator means were to be mounted upstream of the heating element, the desired modulated effect of the air would be substantially diminished by the presence of element 22 in the modulated air stream in passing through the conduit 20. The modulated air after leaving the conduit is then directed against the wet prearranged hair fibers 32 wound or constrained on a suitable form 33. The hair fibers are rapidly dried and thereafter substantially maintain their predetermined configuration for an indefinite period of time.

Figure 9:
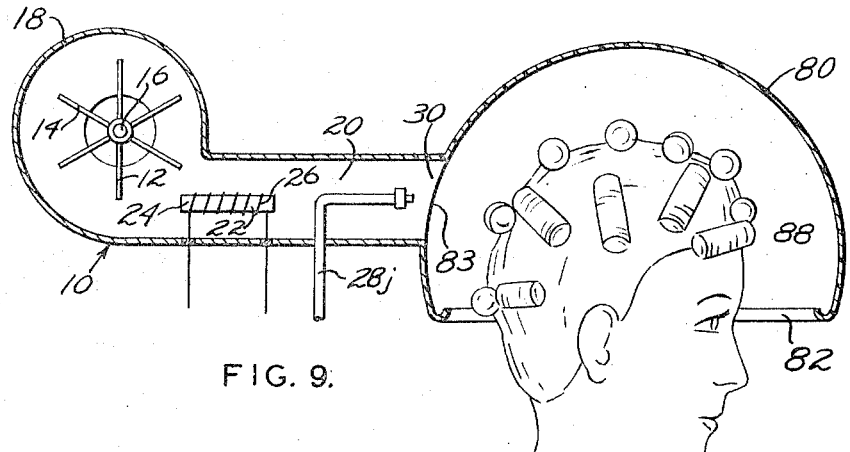
FIGURE 9 is a view similar to that of FIGURE 1 including a hood arrangement for applying a heated and ultrasonically modulated air stream to hair on a human head.

Reference is now made to FIGURE 9 which shows drying apparatus similar to that of FIGURE 1 which includes a hood arrangement identified by reference numeral 80 having one opening 82 aligned with and connected to the outlet 30 of conduit 20. The hood 80 is substantially hemispherical in shape and is provided with a second opening 84 of a size sufficient to receive a human head conveniently and yet provide some constriction of the air egress passage therearound. The restricted flow of air about the head tends to provide a more even distribution of the air modulated by whistle 28j issuing from conduit 20 over the entire head.

In a further embodiment of the invention shown in FIGURE 4, a plurality of whistles indicated as 28a, b, c, d and e are positioned in the conduit 20 downstream to the heating element 22 and mounted in a suitable manner. The principal requirements of the whistles are that they emit ultrasonic vibrations so that the heated air stream is properly modulated. The several whistles may emit ultrasonic vibrations at the same frequency or, if desired, they may emit ultrasonic vibrations at different frequencies as may be required for best results. For example, whistle 28a may emit vibrations which modulate the air stream at 15 kilocycles, whistle 28b at 20 kilocycles, whistle 28c at 22 kilocycles, whistle 28d at 25 kilocycles and whistle 28e at 27 kilocycles. The only major requirement of the frequency of the ultrasonic energy created when the whistles are actuated is that it should be above the audible range. The frequencies best suited for a particular hair fiber may be readily determined by experimental treatment thereof. Different frequency combinations may be made use of by substitution of whistles of different frequencies. Therefore, it is seen that in this embodiment the fan 12 with its blades 14 rotatably mounted in the housing 18 on the hub 16 forces air into the elongated conduit 20 past the heating element 22 and is then modulated to the desired frequency by the series of whistles 28a, b, c, d and e after which it leaves the apparatus at the exit 30. The thus modulated air is directed against the wet constrained hair fibers in order to rapidly dry the hair fibers so that they will indefinitely retain their predetermined configuration.

In another embodiment of the invention as shown in FIGURE 5, the conduit 20 is separated into several separate independent channels 31a, b and c posterior of the heating device 22. Each channel contains a suitable whistle 28f, g and h, mounted therein. All of the whistles are actuated by a high pressure air, the source of which is not shown. The several whistle means may also emit ultarsonic vibrations at different frequencies as may be required for best results.

One whistle means which may be used in this invention is shown in FIGURES 2 and 6 and is of the stem-jet variety comprising a tube 34 having an inlet 36 and an outlet 38 tapered to a smaller diameter. A perforated plate 40 is positioned within the tube supporting a stem 42 which protrudes axially from the outlet 38. A cup 44 is axially supported on stem 42 with the opening thereof in opposed relation to outlet 38 to form an annular slot 46. A bell collar 48 is positioned on tube 34 near the outlet end thereof with the bell opening being directed opposite the opening of cup 44. The edges of the tube at the outlet and the edge of the cup 44 are tapered to a knife edge. When high pressure air is introduced into tube 34, the escape thereof between the tube outlet and cup 44 through annular slot 46 produces a high efficiency whistle. This type of whistle is very efficient and produces the necessary ultrasonic frequencies with a minimum volume of air. The size of the whistle and the positioning of cup 44 relative to outlet 38 determine the frequency of a particular whistle. The air stream passing through conduit 20 is modulated at the frequency or frequencies of the whistles mounted thereon. Other types of whistles well-known in the art may be used with equal success in the present invention, such as the jet-edge generator (Pohlmann), the siren, the Hartmann generator, the Boucher Monowhistle (Macrosonics Corporation), the Demister stem-jet whistle (Astrosonics, Inc.), the point-jet whistle (Teknika, Inc.), the Levavasseur whistle (Acoustica Associates, Inc.), the vortex whistle and the Galton whistle, to name a few.

In carrying out the present invention, strands of aqueously treated or wetted fibers, including hair, which are to be dried are forcibly restrained in a predetermined arrangement by a suitable means, and then are subjected to the ultrasonically modulated air stream emitted from conduit 20 via exit 30. It is found that drying natural hair by using a modulated air stream in the ultrasonic range will considerably hasten the drying effect without any deterioration of the individual hair fibers. Moreover, the hair fibers will tend to remain indefinitely in the predetermined configuration in which they were arranged after being subjected to the aforesaid ultrasonic modulated air stream during the drying thereof. This configuration will tend to be retained even though the fibers are later washed, bleached or subjected to other types of treatment.

It is not precisely understood why the process of the invention utilizing an ultrasonically modulated air stream operates to more efficiently dry the hair and other fibers. However, as is depicted in FIGURE 3, the modulated air contains low pressure zones 54a, b, c interspersed with higher pressure zones 52a, b, c and the repeated application of the low pressure zones to the wet hair fibers will tend to lift the scales located on the exterior surface of all individual hair fibers and thereby permit the easy and rapid vaporization of the water. It should be noted that when any heated air is applied to a wet hair fiber, the moisture is removed therefrom by evaporation. However, the scales located on the exterior sides of all natural hair fibers tend to resist the removal of evaporated water and locks or bars the easy exit from the hair fibers of any water therein. It is only with the repeated application of the low pressure zones which occur in the modulated air as specified in this invention to the wet hair fibers that the aforesaid scales are lifted away from the exterior sides of the individual hairs and thereby will remove the obstacle which prevent the easy exit of the water therein and accordingly will cut the required drying time to an absolute minimum.

In a similar manner, it is believed that the extraordinary and novel curling of the hair when contacted with air modulated at ultrasonic frequencies as contemplated by this invention is achieved by the repeated application of the higher pressure zones of the ultrasonically modulated air to the wet hair fibers. This results in a constant pounding effect and will cause a stress reorientation of the hair fibers. It would appear that the molecular structure of the hair fibers has actually undergone a change in position under the constant and repetitious pounding of the higher pressure zones within the modulated air stream thereby resulting in a substantially permanent stress reorientation or curling of the hair. Of course, when a new curl or curling design is required, the hair may merely be wetted again and constrained in the desired manner after which the properly modulated air is applied thereto. This will again reorient the molecular structure of the individual hair fibers and result in a substantially permanent curling configuration of the hair.

Referring now to FIGURE 7, there is shown a conduit 56 for a fluid media, such as water. A nozzle 58 is attached to the end of conduit 56 and adapted to direct a water spray onto form 60 about which is wound and restrained hair 62 to be treated. An ultrasonic transducer 64, such as barium titanate, with or without additions, is coupled to the conduit and driven by a suitable ultrasonic signal generator 66. The fluid in conduit 56 issues from nozzle 58 in a stream modulated at ultrasonic frequency and impinges on hair 62. The ultrasonic energy is then uncoupled from the hair, which is then dried, retaining the set.

Figure 8:
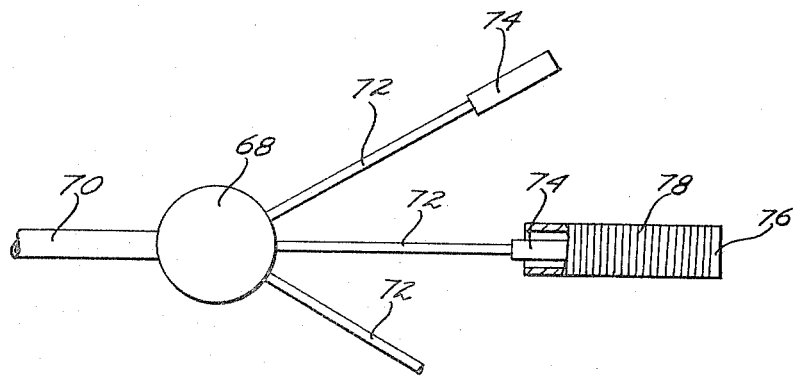
FIGURE 8 illustrates a distribution system feeding a plurality of whistles positioned within individual curl forms.

Further, as illustrated in FIGURE 8, a stream of air may be introduced into manifold 68 from conduit 70 and distributed into conduits 72. Each conduit 72 is terminated in a whistle 74 of a size to be inserted within a curl form 76. Curl form 76 may be perforated or otherwise porous to permit air issuing from whistle 74 to impinge on hair 78 wound around the curl form.

Figure 10:
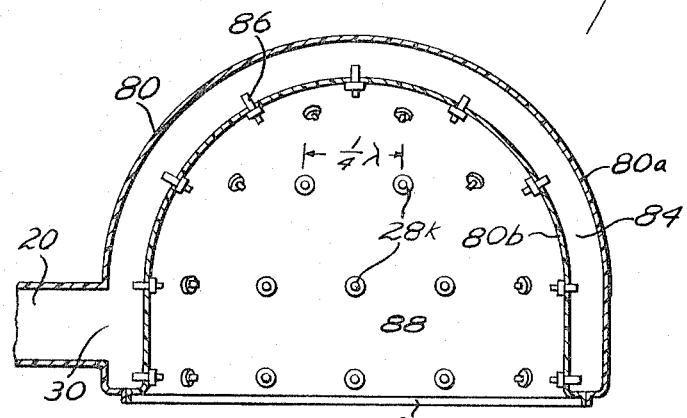
FIGURE 10 is a cross sectional view of another hood arrangement, with portions broken away to conserve space, using a plurality of low pressure whistles for ultrasonic generation.

Referring now to FIGURE 10, there is shown hood 80 having a spaced double wall structure with an outer wall 80a and an inner wall 80b defining a space 84 therebetween communicating with and connected to conduit 20 of the dryer of FIGURE 9. The lower edges of walls 80a and 80b are sealed together and combine to form opening 82 of the hood. The inner wall 80b of hood 80 is provided with a plurality of apertures 86 therethrough communicating the space 84 between the walls 80a and 80b with the cavity 88 of the hood and the opening 82 thereof. The ultrasonic generator or transducer means 28j of FIGURE 9 may be omitted from conduit 20 and a plurality of ultrasonic generator means in the form of whistles 28k are positioned in the apertures 86 in inner wall 80b of hood 80. The whistles 28k are of a low air velocity type and are preferably spaced apart about one-quarter wavelength (¼λ) of the generated frequency or less to provide for synchronization of all whistles at the same frequency which then will act as a piston radiator. Thus it is seen that air from conduit 20 issues from space 84 through low pressure whistles 28k to modulate the air impinging on the hair on a human head positioned under and within the cavity 88 of hood 80.

Figure 11:
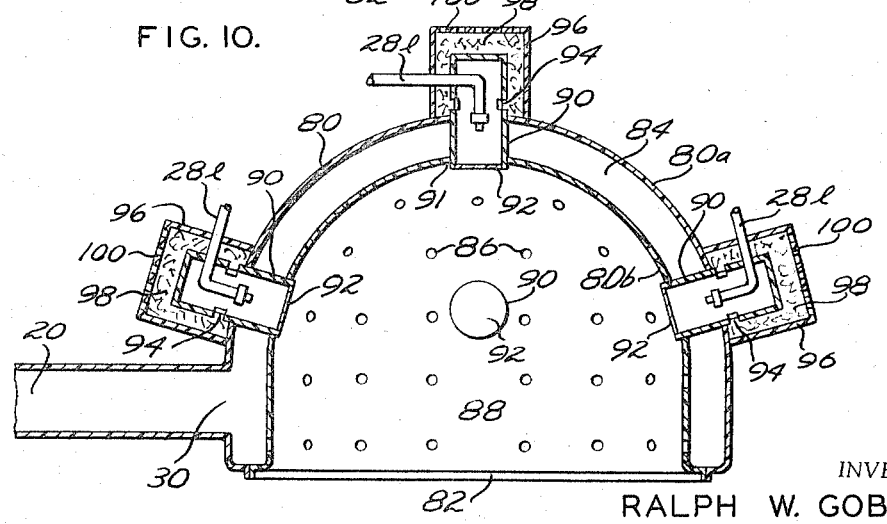
FIGURE 11 is a cross sectional view of still another hood arrangement, with portions broken away to conserve space, using a plurality of high pressure whistles for ultrasonic generation.

Referring now to FIGURE 11, there is shown another hood 80 having spaced double walls 80a and 80b defining a space 84 communicating with and connected to conduit 20 of the dryer 10. The inner wall 80b is provided with a plurality of apertures 86 communicating the space 84 with the cavity 88 of hood 80 and opening 82. A plurality of ultrasonic generator means 28l are positioned on the exterior of hood 80. Generator means 28c are shown as high pressure whistles connected to a source of air or other gas under high pressure. The whistles are mounted in a chamber 90 positioned in an opening 91 through both the outer and inner walls 80a and 80b of the hood 80 in air-tight relation. One end 92 of chamber 90 is substantially transparent to sound but will not permit a gas to pass. The end 92 of the chamber is positioned near the inner wall 80b to confront the cavity 88. Chamber 90 is provided with several openings 94 positioned outside of outer wall 80a through which the gases introduced into chamber 90 escape. A sound muffling means 96 is provided around the portion of chamber 90 outside the hood and filled with a packing material 98 which serves to baffle the escaping gases to reduce the noise. The muffler means 96 has one wall 100 which is perforated to allow the gas to escape. The inner wall 80b is provided with a plurality of apertures 86 through which warm air from conduit 20 issues and is modulated by whistles 28l.

Figure 12:
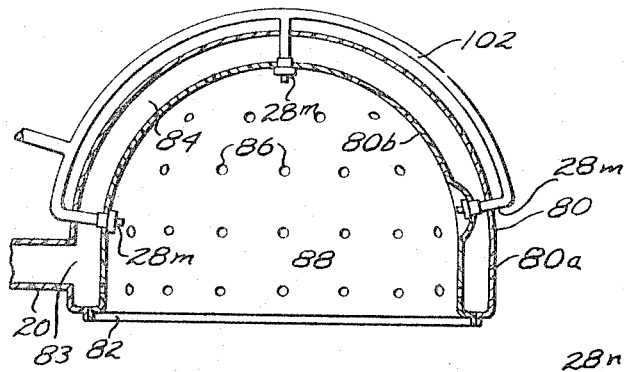
FIGURE 12 is a cross sectional view of still another hood arrangement, with portions broken away to conserve space, using a plurality of medium pressure whistles for ultrasonic generation.

Referring now to FIGURE 12, there is shown a hood 80 having spaced outer and inner walls 80a and 80b defining a space 84 therebetween. The outer wall is provided with an air inlet opening 83 connected to conduit 20 which then communicates with space 84. The inner wall 80b is provided with a plurality of apertures 86 therethrough, through which air entering space 84 escapes into the cavity 88 of the hood 80. A plurality of ultrasonic generator means in the form of whistles 28m are positioned to exhaust into the cavity 88 and modulate the air issuing from apertures 86. The whistles 28m are connected by a manifold 102 to a source of gas under pressure, not shown, for energization. The whistles 28m may extend into the cavity 88 or be recessed in the manner shown.

Figure 13:
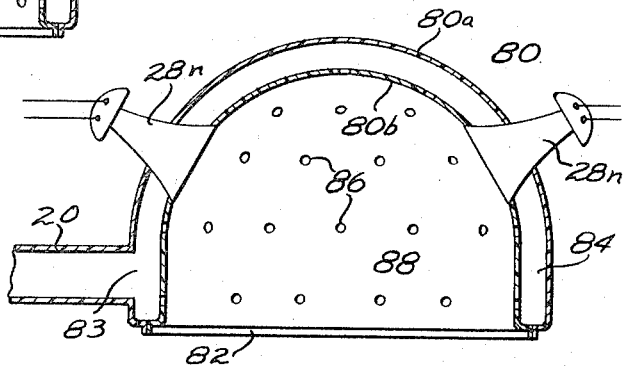
FIGURE 13 is a cross sectional view of still another hood arrangement, with portions broken away to conserve space, using a plurality of electromagnetic speakers or tweeters for ultrasonic generation.

Referring now to FIGURE 13, there is shown a hood 80 having spaced outer and inner walls 80a and 80b defining a space 84 therebetween. The outer wall is provided with an air inlet opening 83 connected to conduit 20 which then communicates with the space 84. The inner wall 80b is provided with a plurality of apertures 86 therethrough, through which air entering space 84 escapes into the cavity 88 of the hood 80. A plurality of ultrasonic generator means 28n of the electromagnetic variety are positioned to exhaust into the cavity 88 and modulate the air issuing from apertures 86. The ultrasonic generators are connected to a suitable ultrasonic signal generator, not shown, for energization.

Figure 14:
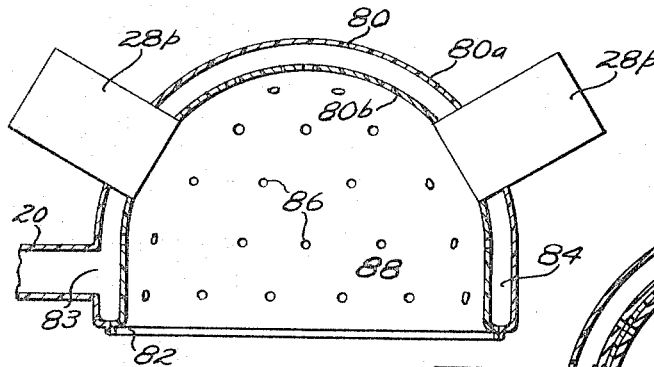
FIGURE 14 is a cross sectional view of still another hood arrangement, with portions broken away to conserve space, using a plurality of sirens or fluid stream choppers for ultrasonic generation.

Referring now to FIGURE 14, there is shown a hood 80 having spaced outer and inner walls 80a and 80b defining a space 84 therebetween. The outer wall 80a is provided with an air inlet opening 83 connected to conduit 20 which then communicates with the space 84. The inner wall 80b is provided with a plurality of apertures 86 therethrough, through which air entering the space 84 escapes into the cavity 88 of the hood 80. A plurality of ultrasonic generator means in the form of an electromechanical transducer such as motor driven sirens 28p are positioned to exhaust into the cavity 88 and modulate the air issuing from apertures 86. The sirens are connected to a suitable source of electric power, not shown, for energization.

Figure 15:
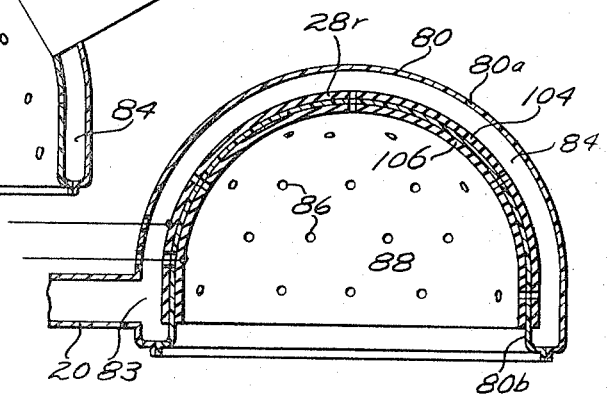
FIGURE 15 is a cross sectional view of still another hood arrangement, with portions broken away to conserve space, including an electrostatic transducer for ultrasonic generation.

Referring now to FIGURE 15, there is shown a hood 80 having spaced outer and inner walls 80a and 80b defining a space 84 therebetween. The outer wall 80a is provided with an air inlet opening 83 connected to conduit 20 which then communicates with the space 84. The inner wall 80b is provided with a plurality of apertures 86 therethrough, through which air entering the space 84 escapes into the cavity 88 of the hood 80. Each side of inner wall 80b is provided with a layer 104 and 105 of a semi-conductor material, which layers are insulated one from the other by the inner wall 80b which is of electrical insulation material. The layers of semi-conductors 104 and 106 together with inner wall 80b form an ultrasonic generator in the form of an electrostatic speaker. The layers 104 and 106 forming electrodes are connected across an ultrasonic signal generator, not shown, for energization to modulate the air issuing from apertures 86 which are seen to pass through layers 104 and 106.

Figure 19:
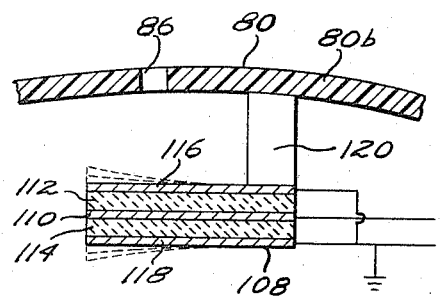
FIGURE 19 is a fragmentary cross sectional view to an enlarged scale of one of the bimorph elements.

Referring now to FIGURE 19, there is shown in cross section a bimorph element 108 such as that manufactured by the Clevite Electronic Components Division of the Clevite Corporation, 232 Forbes Road, Bedford, Ohio, known as part numbers 55853, 55890, 60328 and 60432. The bimorph ceramic elements are used extensively as the generator unit in ceramic phonograph cartridges. Similar units are also available from Gulton Industries, 212 Durham Ave., Metuchen, New Jersey. The bimorph 108 is comprised of a center metallic electrode 110 sandwiched between two layers 112 and 114 of a piezoelectric material such as barium titanate or lead zirconium titanate. The layers 112 and 114 each have an outer metallic electrode 116 and 118. The electrodes 116 and 118 are connected together and to one side of an ultrasonic signal generator, not shown, and electrode 110 is connected to the other side of a generator. On being energized, the bimorph will vibrate in a mode indicated by the dotted lines.

Figure 16:
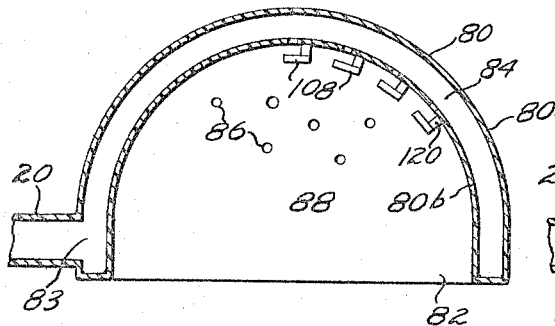
FIGURE 16 is a cross sectional view of still another hood arrangement, with portions broken away to conserve space, including a plurality of bimorph elements for ultrasonic generation.

Referring now to FIGURE 16, there is shown a view in cross section, with portions broken away to conserve space, of still another embodiment utilizing the bimorph element of FIGURE 19 as the ultrasonic generator means. A plurality of bimorphs 108 are mounted on support means 120 attached to inner wall 80b. The bimorph elements are positioned in rows inside the hood 80 and are electrically connected in parallel such that upon activation the air issuing from apertures 86 in the hood is modulated at a function of the frequency of the driving voltage from the signal generator.

Figure 17:
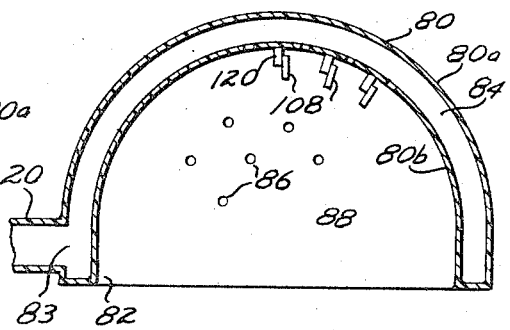
FIGURES 17 and 18 are similar to FIGURE 16 showing a different arrangement of the bimorph elements.

FIGURE 17 similarly shows a cross sectional view of a hood arrangement wherein the bimorph elements 108 are mounted on mounts 120 to extend radially from the inner wall 80b. Here again, the application of ultrasonic signals to the bimorphs results in the modulation of the air issuing from apertures 86 of wall 80b.

Figure 18:
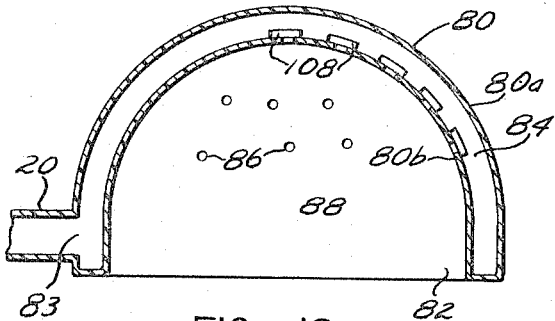

Referring now to FIGURE 18, a plurality of bimorph elements 108 are mounted within space 84 of hood 80 and upon being energized are positioned to close and open apertures 86 at a rate which is a function of the frequency of the signal generator. Thus the air entering cavity 88 of hood 80 is modulated at such function of the frequency.

Figure 20:
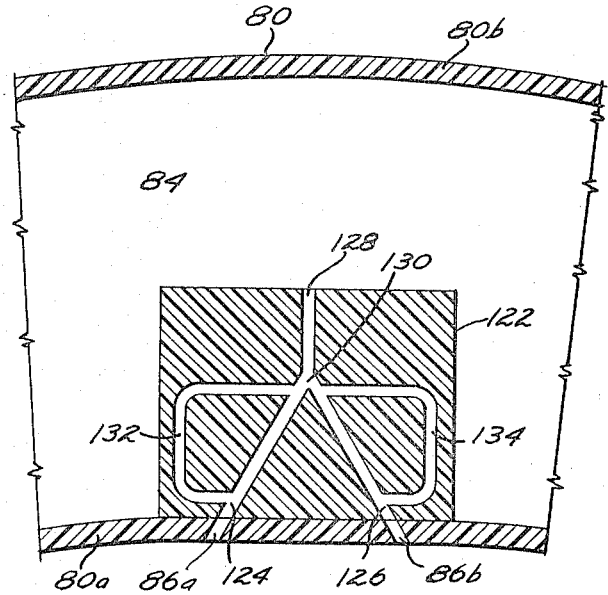
FIGURE 20 is a fragmentary cross sectional view of a fluid flip-flop suitable for the ultrasonic modulation of an air stream in accordance with the invention.

Referring now to FIGURE 20, there is shown a fluid logic flip-flop or chopper 122. The chopper comprises a pair of conduits 124 and 126 arranged in V-shaped configuration and joined by conduit 128 at the apex as at 130. Conduits 124 and 126 are aligned at their outer ends with apertures 86a and 86b in inner wall 86b of hood 80 with the chopper being positioned within the space 84. Air within space 84 enters conduit 128 of chopper 122 and will be directed to issue from one or the other of the conduits 124 or 126 due to the aerodynamics at the apex 130. As the air passes through the conduit, a portion thereof will be fed back to the apex via either feedback conduit 132 or 134 to switch or flip the air stream to the other conduit. The frequency of this switching determines the rate at which the air is modulated. A plurality of choppers or proportional amplifiers, depending on whether a square wave or sine wave output is desired, are positioned in the space 84 to be aligned with apertures 86a and 86b to provide the necessary modulation of the air stream. Fluid logic devices suitable for use in this invention are manufactured by the Corning Glass Works, Fluidic Products Department, Bradford, Pennsylvania, known as part numbers FB 2511-2-1211 (proportional amplifier) and FB 2211-3-1321 (bistable). Similar devices are also available from Fluidonics Division of Imperial Eastman Corporation, 6300 W. Howard St., Chicago, Illinois, known as FB 2212-2-1211.

It will be appreciated that there are many different types of devices which may be used to provide the modulation of the air stream which is a necessary part of the present invention. Further, it is to be understood that while the use of heated air will provide an increase in the rate of moisture removal from the fibers, it is not necessary for the air to be heated to accomplish the ultrasonic treatment and curling of the fibers. The stress relief of the fibers is equally effective with either heated or unheated modulated air.

While there has been described what at present are considered to be the preferred embodiments of the invention, it will be obvious to those skilled in the art that various changes and modifications may be made therein without departing from the invention. It is aimed therefore, in the appended claims to cover all such changes and modifications which fall within the true spirit and scope of the invention.

What is claimed is:

1. In a hair dryer, a housing having an inlet and an outlet, a blower mounted in said housing for forcing air through said housing, a head encircling hood means having a cavity to receive the head connected to said housing outlet for receiving air therefrom and ultrasonic generator means mounted downstream of said blower adapted to impart ultrasonic modulation to the air stream received by said hood means, said modulated air being employed in the treating of natural and synthetic fibers.

2. In a hair dryer, a housing having an inlet and an outlet, a motor driven fan mounted in said housing, said fan being adapted to force air through the housing, the improvement comprising head encircling hood means connected to receive air from said housing outlet and an ultrasonic generator means mounted downstream of said fan and adapted to modulate the air stream received by said hood at an ultrasonic frequency, said modulated air being employed in the treating of natural and synthetic fibers.

3. The arrangement according to claim 1 wherein said hood means comprises inner and outer substantially hemi-spherical wall portions joined at their edges to define a space therebetween communicating the outlet of said housing and said inner wall portion being provided with a plurality of apertures therethrough distributed over the surface thereof to exhaust into the cavity of the hood.

4. The arrangement according to claim 1 wherein said housing includes a heating element therein and said ultrasonic generator is mounted in said housing downstream of said heating element.

5. The arrangement according to claim 3 wherein said ultrasonic generator means comprises a whistle mounted in at least one of the apertures in the inner wall portion of said hood means.

6. The arrangement according to claim 5 wherein the ultrasonic generator means comprises whistles of similar frequency range mounted in the apertures of said inner wall portion, which apertures are spaced apart by a distance not substantially greater than a one-quarter wavelength of the mean sonic frequency generated by said whistles.

7. The arrangement according to claim 3 wherein the ultrasonic generator means comprises a plurality of high pressure whistles, said whistles being mounted to exhaust into a chamber having a substantially sound transparent, gas impervious wall, said chamber being mounted on the hood with the sound transparent wall communicating the cavity of the hood, said chamber having an opening therein external of the cavity of said hood for the exhaust of gas from said chamber.

8. The arrangement according to claim 2 wherein said housing includes a heating element positioned therein for warming the air prior to exit from said housing and said ultrasonic generator means is mounted downstream of said heating element.

9. The arrangement according to claim 5 wherein a plurality of whistles are connected to a manifold external of the hood for connection to a source of gas under pressure.

10. The arrangement according to claim 1 wherein the ultrasonic generator means comprises at least one electromagnetic transducer means mounted on the hood to modulate air in the hood cavity.

11. The arrangement according to claim 1 wherein the ultrasonic generator means comprises an electrostatic transducer means mounted on the hood to modulate air within the hood cavity.

12. The arrangement according to claim 1 wherein the ultrasonic generator means comprises a plurality of electro-mechanical transducers mounted on the hood to act in concert in modulating the air within the hood cavity.

13. The arrangement according to claim 1 wherein the ultrasonic generator means comprises a plurality of chopper means to sequentially interrupt the flow of air into the cavity of the hood and modulate same at an ultrasonic frequency.

References Cited by the Examiner
UNITED STATES PATENTS

| | | | |
|---|---|---|---|
| 2,576,297 | 11/1951 | Horsley et al. | 34—4 X |
| 2,740,202 | 4/1956 | Fowle. | |
| 3,175,299 | 3/1965 | Boucher | 34—4 |
| 3,211,159 | 10/1965 | Goble | 132—7 |
| 3,254,424 | 6/1966 | Goble | 34—97 |

JAMES W. WESTHAVER, *Primary Examiner.*

A. D. HERRMANN, *Assistant Examiner.*